United States Patent
Machida et al.

(10) Patent No.: US 7,526,925 B2
(45) Date of Patent: May 5, 2009

(54) METHOD AND APPARATUS FOR PRODUCING SLUSH NITROGEN

(75) Inventors: Akito Machida, Koto-ku (JP); Kazuhiro Hattori, Koto-ku (JP); Kouichi Matsuo, Koto-ku (JP)

(73) Assignee: Mayekawa Mfg. Co., Ltd., Tokyo (JP)

( * ) Notice: Subject to any disclaimer, the term of this patent is extended or adjusted under 35 U.S.C. 154(b) by 328 days.

(21) Appl. No.: 11/499,147

(22) Filed: Aug. 4, 2006

(65) Prior Publication Data

US 2006/0266078 A1 Nov. 30, 2006

Related U.S. Application Data

(63) Continuation of application No. PCT/JP2004/001249, filed on Feb. 6, 2004.

(51) Int. Cl.
*F25J 1/00* (2006.01)
*F17C 5/00* (2006.01)

(52) U.S. Cl. .......................... 62/601; 62/54.1
(58) Field of Classification Search ............... 62/54.1, 62/601
See application file for complete search history.

(56) References Cited

U.S. PATENT DOCUMENTS

| | | | |
|---|---|---|---|
| 3,354,662 A | | 11/1967 | Daunt |
| 4,009,013 A | * | 2/1977 | Schrawer et al. ............. 62/601 |
| 4,488,407 A | | 12/1984 | Delano |
| 5,154,062 A | * | 10/1992 | Gaumer et al. ............... 62/54.1 |
| 5,282,577 A | | 2/1994 | Neitz |
| 5,402,649 A | * | 4/1995 | Glasser ....................... 62/54.1 |
| 6,131,397 A | | 10/2000 | Davis et al. |
| 6,381,967 B1 | * | 5/2002 | Craig ........................... 62/64 |
| 6,405,541 B1 | | 6/2002 | Brunnhofer |
| 7,155,930 B2 | * | 1/2007 | Kawamura et al. ........... 62/601 |

FOREIGN PATENT DOCUMENTS

| | | |
|---|---|---|
| JP | 5-71841 A | 3/1993 |
| JP | 6-241647 A | 9/1994 |
| JP | 6-281321 A | 10/1994 |
| JP | 8-283001 A | 10/1996 |

(Continued)

OTHER PUBLICATIONS

Relevant portion of International Search Report of corresponding PCT Application PCT/JP2004/001249.

(Continued)

*Primary Examiner*—William C Doerrler
(74) *Attorney, Agent, or Firm*—Rossi, Kimms & McDowell, LLP

(57) ABSTRACT

A method for producing slush nitrogen comprises the steps of: spraying liquid nitrogen from a nozzle into a vessel kept under a reduced pressure with a nozzle diameter and a spraying pressure being so adjusted as for the liquid nitrogen to maintain the form of droplets, to thereby form liquid nitrogen fine particles having a uniform particle diameter and disperse said particles in the vessel; vaporizing nitrogen from the droplet particles during the stay thereof in the space of the vessel, to solidify liquid nitrogen particles by vaporization latent heat and form fine solid nitrogen particles having a uniform particle diameter; and mixing the solid nitrogen particles with liquid nitrogen.

5 Claims, 2 Drawing Sheets

FOREIGN PATENT DOCUMENTS

| | | |
|---|---|---|
| JP | 8-285420 A | 11/1996 |
| JP | 2000-258053 A | 9/2000 |
| WO | WO 2004/080892 A1 | 1/2004 |

OTHER PUBLICATIONS

Ishimoto, J. et al.; Basic study on two-phase flow characteristics of slush nitrogen in a pipe; Database Inspec [online] IEE, Stevenage, GB; 2004; XP-002472067; Database accession No. 8338512. English abstract provided.

Supplementary European search report issued in corresponding EP patent application No. EP-04708884 dated Mar. 19, 2008.

Official Action of corresponding Russian application No. 2006118348/15(019967). English translation provided.

Beljakov, V. P.; "Cryogenic Technique and Technology"; Moscow, Energy Publishing House, 1982; pp. 73-76 (D3). English translation provided.

First Office action of corresponding Chinese application No. 200480039887X dated May 9, 2008. English translation provided.

Shimo, Li et al; "Slush Hydrogen Production Methods Properties and Applications"; Vacuum & Cryogenics, Sep. 30, 1996; pp. 149-152. English abstract provided.

* cited by examiner

METHOD AND APPARATUS FOR PRODUCING SLUSH NITROGEN

TECHNICAL FIELD

The present invention is related to a method and an apparatus for producing a slurry of liquid nitrogen and solid nitrogen particles, i.e. slush nitrogen.

BACKGROUND ART

Liquid nitrogen is used as a nonflammable and portable cold source in various industries. Furthermore, low temperature, solid nitrogen is poorly transfers heat when cooling a solid surface. Additionally, nitrogen cannot be used as a fluid, and hence its usage is limited.

Recently, a high temperature super conductive material has been discovered and practically applied. Consequently, a super conductive system capable of cooling at the same temperature as a liquid nitrogen temperature has emerged. A temperature as low as 65 K is a limit for cooling without solidifying liquid nitrogen, which has a melting point of 63 K. Since an upper limit just before boiling is approximately 75 K, a temperature range capable of cooling with a sensible heat of liquid nitrogen varies by 10 K.

Since the specific heat of liquid nitrogen is 2 kJ/kg, a heat content per unit mass of liquid nitrogen capable of variation of sensible heat is only 20 kJ/kg. Further, as a matter of fact, a property of a super conductive body is usually more stable at a low temperature (near the solidifying temperature of liquid nitrogen) than at a high temperature (near the boiling temperature of liquid nitrogen.)

Thus, since a temperature range capable of cooling utilizing a sensible heat of liquid nitrogen is narrow and its heat content is small, a great deal of liquid nitrogen is necessary. Hence, a large super conductive apparatus becomes necessary. If a cooling temperature rises to a boiling point, for example, a performance of the super conductive body is limited to the temperature thereof. Consequently, using a slurry of solid nitrogen particles and liquid nitrogen, so-called slush nitrogen, that is capable of being utilized together with a latent heat of phase change (25 kJ/kg), makes it possible to maintain the low temperature near the triple point of nitrogen (63K.) Hence, the aforementioned difficulty can be overcome.

There also is a demand for slush hydrogen as liquid fuel for the space industry. For example, a slush hydrogen producing apparatus is disclosed on Japanese laid-open patent publication No. 6-241647(1994), wherein hydrogen is liquefied with a heat exchanger by utilizing cold liquid helium. A part of the liquid hydrogen is further solidified on a solid surface and cooled by the liquid helium, and the generated solid hydrogen is scraped.

Japanese laid-open patent publication No. 6-281321(1994) discloses a method and an apparatus for producing slush hydrogen by solidifying liquid hydrogen on a solid surface cooled by cold liquid helium in a cryostatic container and scraping the generated solid hydrogen, wherein a great deal of slush hydrogen is produced by releasing the super cooled liquid hydrogen into the cryostatic container.

In Japanese laid-open patent publication No. 8-283001 (1996), a method and apparatus for producing slush hydrogen, in which solid hydrogen is generated by blowing hydrogen gas into liquid helium and triple point liquid hydrogen is mixed with the generated solid hydrogen.

In each case, hydrogen is changed by the application of helium. Suppose the art is applied to the production of slush nitrogen. When helium is recycled by condensing it as a cooling agent, a liquefying machine is necessary and the temperature for liquefaction of helium needs to be lower than the temperature for liquefaction of nitrogen or hydrogen. Such a process has the disadvantages of requiring a big apparatus and having a high production cost.

Therefore, the applicant of the present invention proposed methods for producing slush nitrogen on unpublished patent applications JP 2003-065571 and JP 2003-391508. The former is an art in which slush nitrogen is produced by sucking liquid nitrogen in a low temperature vessel using a low temperature refrigerant capable of generating solid nitrogen as a working fluid. Because only helium can be used as a low temperature refrigerant to generate solid nitrogen, a particular means is needed in order to prevent occluding an ejector nozzle with solid nitrogen. As for control of solid nitrogen particle size, though it can be possible in a way by a nozzle diameter or a pressure of fluid, there are too many factors to control in order to obtain stably fine particles having a uniform particle diameter. The latter is an art in which a gas phase in a vessel of liquid nitrogen is depressurized to evaporate nitrogen in a liquid phase so as to lower a temperature finally to the triple point of the nitrogen; solid nitrogen is generated by keeping the triple point and generated solid nitrogen is finely pulverized to obtain slush nitrogen. However, control of a particle diameter is difficult.

Meanwhile, as industrial application of slush nitrogen has advanced, the flow property of a fluid has become essential. More specifically, it is required that solid nitrogen particles in the slush nitrogen are finely pulverized and a particle size is made uniform so as to exert a good flow property of little pressure loss. Thus, when a long and big body is cooled in flowing slush nitrogen, or slush nitrogen is transferred for a long, distance, cooling or transferring can be realized with high performance and high efficiency.

SUMMARY

The present invention has been done in view of the problems that the aforementioned prior arts have and in view of recent needs. The object of the present invention is to provide a method and an apparatus for producing slush nitrogen including fine solid nitrogen particles, which are controlled in particle size, without a refrigerant of high cost or an incidental apparatus.

According to the present invention, a method for producing slush nitrogen comprises the steps of: spraying liquid nitrogen from a nozzle into a vessel kept under a reduced pressure with a nozzle diameter and a spraying pressure being so adjusted as for the liquid nitrogen to maintain the form of droplets, to thereby form liquid nitrogen fine particles having a uniform particle diameter and disperse said particles in the vessel; vaporizing nitrogen from the droplet particles during the stay thereof in the space of the vessel, to solidify liquid nitrogen particles by latent heat vaporization and form fine solid nitrogen particles having a uniform particle diameter; and mixing the solid nitrogen particles with liquid nitrogen.

The particle size of the sprayed liquid nitrogen is determined by a nozzle diameter and a flow rate determined by a spraying pressure. The shape of the liquid droplets sprayed in a space becomes spherical. Vaporization occurs from the whole surface of the sprayed spherical particles of liquid nitrogen, and a latent heat vaporization is deprived of, so that the temperature of the liquid nitrogen particles become lower than a solidification temperature so as to solidify the particle in the spherical shape. Since a mass of solid nitrogen particles can be found by subtracting a mass of vaporized nitrogen corresponding to a latent heat vaporization necessary for lowering a present temperature (known) of liquid nitrogen particles to the solidification temperature of nitrogen (63 K) from a mass of sprayed particles of liquid nitrogen, a particle diameter of solid nitrogen can be found by geometric calculation from a specific gravity of solid nitrogen. Also, an amount of generated solid nitrogen can be easily found by measuring an amount of vaporized nitrogen as nitrogen gas from supplied liquid nitrogen.

Since the generated solid nitrogen is accumulated at the bottom of a vacuum vessel, slush nitrogen of a given solid concentration can be produced by pouring triple point liquid nitrogen into the vessel and stirring the liquid and solid nitrogen.

According to another aspect of the present invention, an apparatus for producing slush nitrogen comprises: a vacuum pump for depressurizing the inside of a vessel, a vessel capable of being kept under a reduced pressure by the vacuum pump, a nozzle disposed so as to be able to spray liquid nitrogen into the vessel, a pump for delivering liquid nitrogen to the nozzle with pressure, and a stirrer for stirring the contents of the vessel. In the apparatus, the nozzle can be changed to various nozzles of different diameters and a liquid nitrogen delivering pressure can be adjusted. Liquid nitrogen is sprayed into the vessel and kept under a reduced pressure from a nozzle selected from the nozzles by adjusting a spraying pressure so as to form liquid nitrogen fine particles having a uniform particle diameter and disperse said particles in the vessel. Nitrogen is vaporized from the liquid particles during the stay in the space of the vessel in order to solidify the liquid nitrogen particles by latent heat vaporization and form fine solid nitrogen particles having a uniform particle diameter. Finally, the solid nitrogen particles are mixed with liquid nitrogen.

Thus, without a special costly refrigerator or a refrigerant, the apparatus is easily made with a vacuum pump, a spraying means of which the diameter is adjustable (a spraying means which is exchangeable for various kinds of nozzles of different nozzle holes), a vacuum vessel, and a means for supplying liquid nitrogen. The diameter of the nozzle is preferably within a range of between 0.1 mm and 0.2 mm. A spraying pressure of the nozzle is preferably within a range of between 7 kg/cm$^2$ and 10 kg/cm$^2$.

According to the present invention, a plurality of nozzles may be provided in one vessel.

According to the present invention, the nozzle may be a multi-holes type having a plurality of nozzle holes.

According to the present invention, a plurality of the apparatuses for producing slush nitrogen may be connected in parallel, and a process for forming solid nitrogen particles and a process for mixing the solid nitrogen particles with liquid nitrogen having a temperature in the vicinity of the triple point can be performed in separate vessels at the same time, so that each process can be done sequentially and alternatively in each vessel in order to perform the whole processes continuously.

As described above, effects of the present invention are summarized as follows: slush nitrogen containing solid nitrogen fine particles having a controlled particle diameter can be produced without a high-cost refrigerant or an incidental apparatus by spraying liquid nitrogen from a nozzle into a vessel kept under a reduced pressure with a nozzle diameter and a spraying pressure being so adjusted as for the liquid nitrogen to maintain the form of droplets, to thereby form liquid nitrogen fine particles having a uniform particle diameter and disperse said particles in the vessel; vaporizing nitrogen from the droplets particles during the stay thereof in the space of the vessel, to solidify liquid nitrogen particles by vaporization latent heat and form fine solid nitrogen particles having a uniform particle diameter; and mixing the solid nitrogen particles with liquid nitrogen.

DETAILED DESCRIPTION OF THE PREFERRED EMBODIMENTS OF THE INVENTION

The invention will now be described in detail by way of example with reference to the accompanying drawings. It should be understood, however, that the description herein of specific embodiments such as to the dimensions, the kinds of material, the configurations and the relative disposals of the elemental parts and the like is not intended to limit the invention to the particular forms disclosed; the intention is to disclose for the sake of example unless otherwise specifically described.

A First Embodiment

Figure 1:
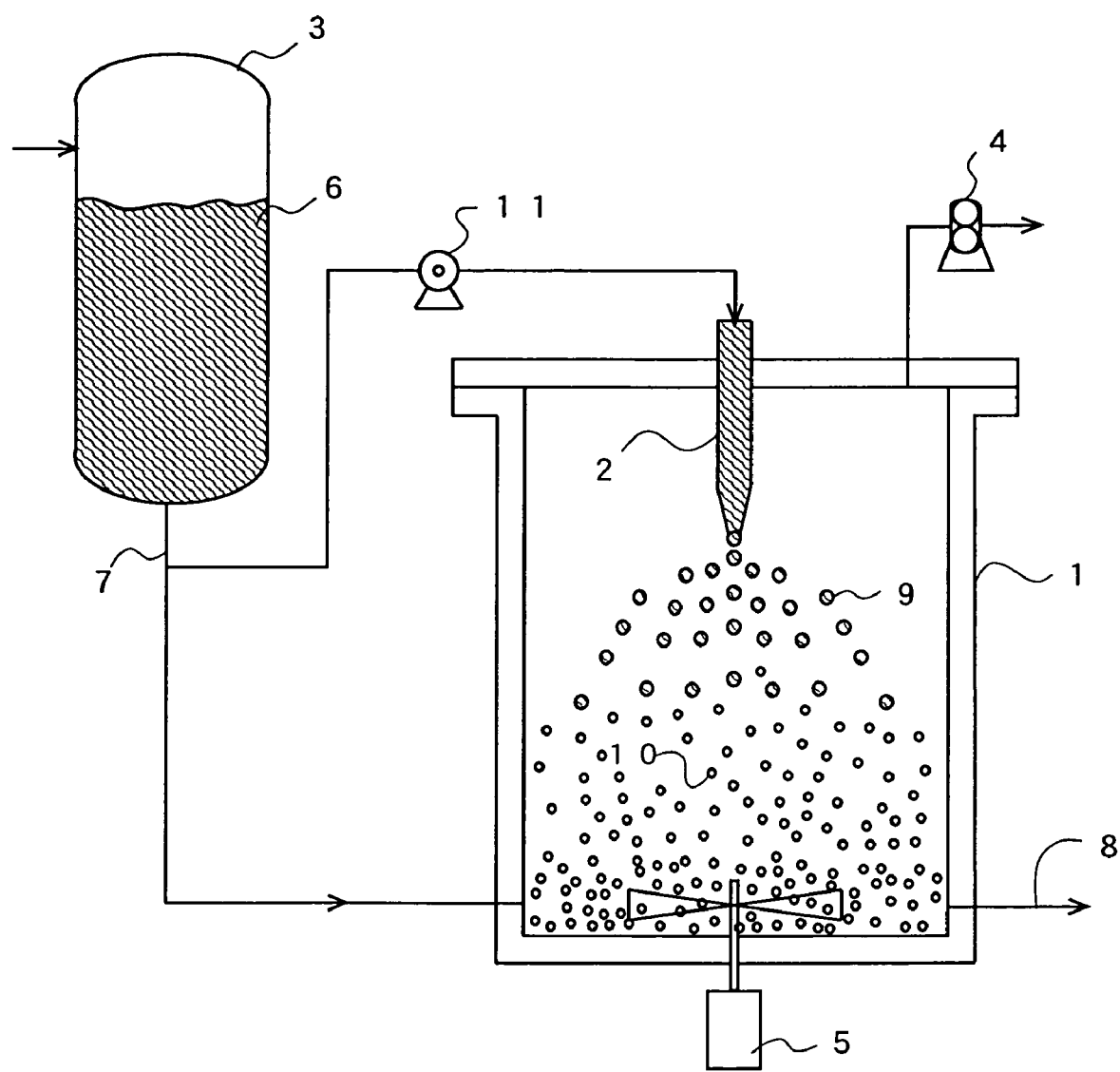
FIG. 1 is a schematic illustration of one embodiment of an apparatus for producing slush nitrogen according to the present invention.

FIG. 1 is a schematic illustration of one embodiment of an apparatus for producing slush nitrogen according to the present invention. In FIG. 1, 1 is a vessel; 2 is a nozzle capable of forming droplets by spraying liquid nitrogen; 3 is a liquid nitrogen tank; 4 is a vacuum pump which keeps the inside of the vessel a vacuum; 5 is a stirrer for stirring liquid nitrogen and solid nitrogen particles provided at the bottom part of the vessel; 6 is liquid nitrogen; 7 is a supply pipe for supplying liquid nitrogen; 8 is a pipe for taking out a slush nitrogen product; 9 are liquid nitrogen particles formed with the nozzle; 10 are solid nitrogen particles solidified from the liquid nitrogen particles; 11 is a pump for delivering liquid nitrogen to the nozzle with a pressure.

Referring to FIG. 1, a construction of an apparatus and a process of the first embodiment according to the present invention are explained as follows. The supply pipe 7 for supplying liquid nitrogen is connected to a liquid nitrogen tank 3, one end of which is connected through a pump 11 to a nozzle 2. Various nozzles with different hole diameters are ready and exchangeable within the range of hole sizes. A pressure inside of the nozzle can be adjusted with a rotational rate of the pump 11 or with a means for adjusting pressure provided at the delivery side of the pump 11 (not shown.) Another end of the supply pipe for supplying liquid nitrogen is connected to the vessel 1. A vacuum pipe is connected to the ceiling part of the vessel so as to be able to depressurize the inside of the vessel by the vacuum pump. The stirrer 5 is provided at the bottom part of the vessel so as to be able to stir a content of the vessel. The pipe 8 for taking out a product is provided in the vicinity of the bottom at the sidewall of the vessel 1.

Liquid nitrogen is stored in the liquid nitrogen tank 3 in advance, or replenished so as to maintain an appropriate liquid level. The nitrogen is supplied to the nozzle 2 through the supply pipe 7 with a pressure range of 7 to 10 kg/cm$^2$. When the liquid nitrogen is sprayed from the nozzle, the diameter of the nozzle 2 is varied within a range between 0.1 mm and 0.2 mm, and the vacuum pump 4 is operated so that the inner pressure of the vessel becomes approximately 93 Torr (which is the triple point). As a result, solid nitrogen particles having any diameter varied between 0.05 mm and 0.1 mm are obtained. Solid nitrogen powder having a sharp particle size distribution is obtained if a nozzle of a definite nozzle hole diameter is used, and a constant supply pressure and a constant reduced pressure are kept.

As solid nitrogen powder is formed and accumulated on the bottom part of the vessel, liquid nitrogen is introduced into the vessel through the supply pipe 7 and the contents are stirred with the stirrer 5 to form fine solid nitrogen particles having a uniform particle diameter. The slush nitrogen is drawn from a pipe 8 for taking out a slush nitrogen product to end the one batch process.

A Second Embodiment

Figure 2:
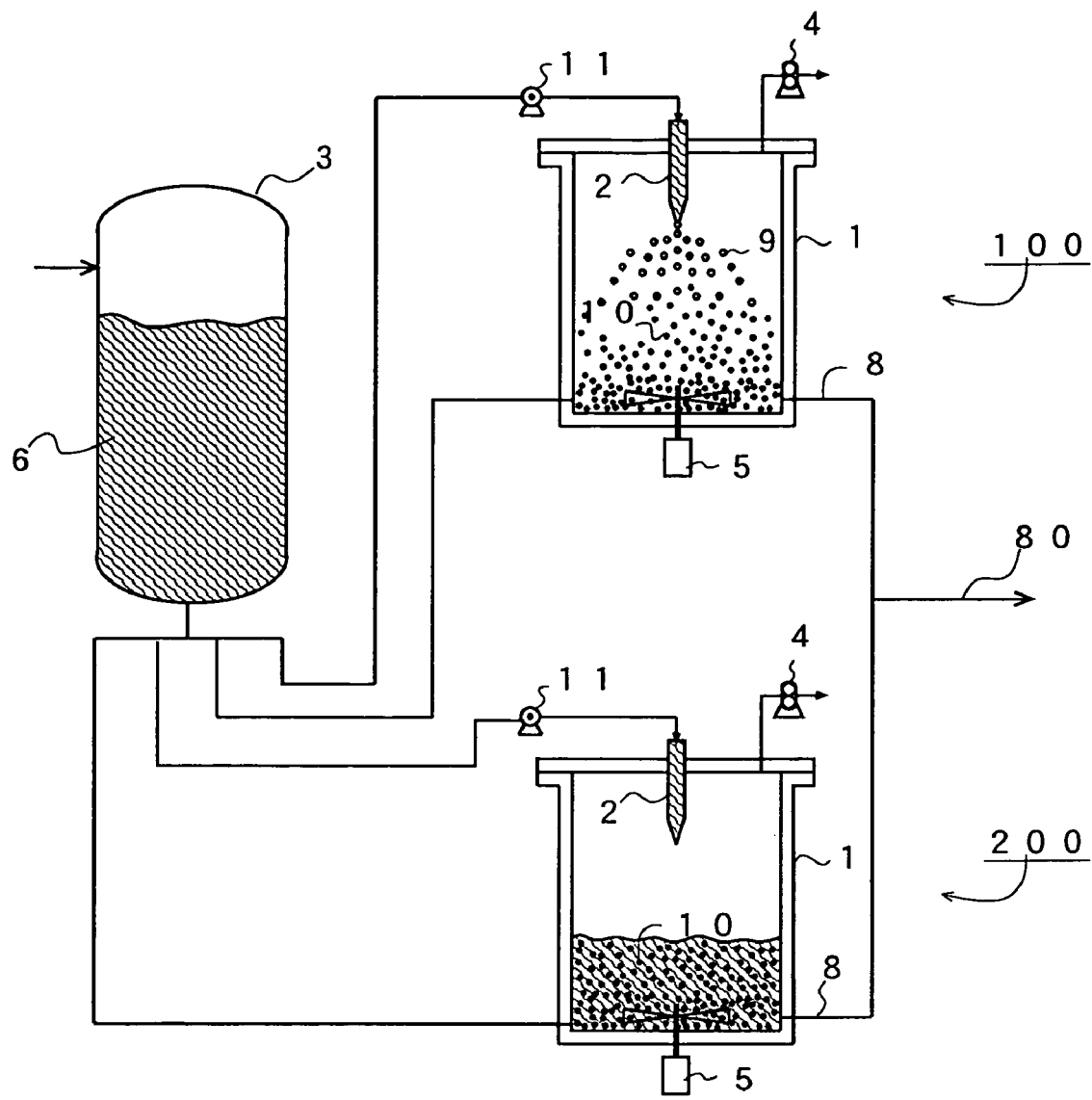
FIG. 2 is a schematic illustration of one embodiment of an apparatus for producing continuously slush nitrogen wherein a plurality of apparatuses are connected according to the present invention.

FIG. 2 is a schematic illustration of an apparatus of a second embodiment according to the present invention. FIG. 2 includes elements from FIG. 1 which are labeled the same, so specific explanation with regard to these elements is omitted. Referring to FIG. 2, a construction of an apparatus and a process of the second embodiment according to the present invention are explained as follows.

Apparatuses for producing slush nitrogen 100 and 200 similar to the apparatus explained in the first embodiment are disposed in parallel. The material supply routes of both the apparatuses are connected to the same tank 3 of liquid nitrogen, and their product removal routes are connected to the same product removal route 80. In the apparatus for producing slush nitrogen 100, the inside of the vessel 1 is maintained depressurized by operating the pump 4, liquid nitrogen 6 is delivered with pressure to the nozzle 2 disposed in the vessel 1 to form liquid nitrogen particles 9, then solid nitrogen powder comprising solid nitrogen particles 10 are produced. Meanwhile, as solid nitrogen powder produced in a previous batch stays in the apparatus 200, liquid nitrogen 6 is introduced into a vessel 1 of the apparatus 200 from the nitrogen tank 3, and the stirrer 5 is operated to mix the contents of the vessel with the liquid nitrogen to produce slush nitrogen containing uniform fine particles of solid nitrogen. After that, the product is taken out by the product removal route 80. A process of producing fine solid nitrogen particles in the apparatus 100 is scheduled to be finished at the same time as when a process of mixing and content removal in the apparatus 200 is finished. Next, in sequence, a solid nitrogen particles production process is changed to a mixing and removal process so as to produce solid nitrogen particles in apparatus 200 and to mix and remove the content in 100. After that, the processes are alternatively and continuously performed.

INDUSTRIAL APPLICABILITY

According to the present invention, slush nitrogen having a good flow property can be produced with an inexpensive apparatus and method, and big and long objects can be effectively cooled, whereby the art can be widely used in a super conductive apparatus industry, among other industries.

What is claimed is:

1. A method of producing slush nitrogen comprising the steps of:
    providing a vessel with a nozzle inside the vessel;
    providing a liquid nitrogen supply external from the vessel;
    depressurizing the vessel substantially to a triple point pressure of nitrogen;
    introducing liquid nitrogen from the liquid nitrogen supply into the vessel, which is kept substantially free of liquid nitrogen, and spraying the liquid nitrogen into the vessel through the nozzle with a nozzle diameter and a spraying pressure adjusted for the liquid nitrogen to produce droplets that disperse, in the vessel;
    vaporizing the droplets by latent heat vaporization to solidify the droplets into fine solid nitrogen particles having a uniform particle diameter in the vessel, which is kept substantially free of liquid nitrogen other than the liquid nitrogen sprayed through the nozzle; and
    separately introducing the liquid nitrogen from the liquid nitrogen supply into the vessel after the solid liquid nitrogen particles have been formed and mixing the solid nitrogen particles with the liquid nitrogen.

2. An apparatus for producing slush nitrogen comprising:
    a vessel;
    a liquid nitrogen supply external from the vessel;
    a vacuum pump for depressurizing the vessel to a triple point pressure of nitrogen;
    a nozzle disposed inside the vessel;
    a pump for delivering the liquid nitrogen from the liquid nitrogen supply to the nozzle with pressure that is adjustable, and for separately delivering the liquid nitrogen from the liquid nitrogen supply into the vessel; and
    a stirrer for stirring content of the vessel,
    wherein a diameter of the nozzle and a spraying pressure are configured to produce droplets that disperse in the vessel, which is kept substantially free of liquid nitrogen other than the liquid nitrogen sprayed through the nozzle,
    wherein the droplets are vaporized by latent heat vaporization to solidify the droplets into fine solid nitrogen particles having a uniform particle diameter in the vessel, which is kept substantially free of liquid nitrogen other than the liquid nitrogen sprayed through the nozzle, and
    wherein the liquid nitrogen from the liquid nitrogen supply is introduced separately into the vessel after the solid nitrogen particles have been formed and the solid nitrogen particles are mixed with the liquid nitrogen with the stirrer.

3. An apparatus for producing slush nitrogen according to claim 2, wherein a plurality of nozzles are provided in the vessel.

4. An apparatus for producing slush nitrogen according to claim 2, wherein the nozzle has a plurality of nozzle holes having different diameters.

5. An apparatus for producing slush nitrogen according to claim 2, further including another vessel, with the vacuum pump, the nozzle, the pump, and the stirrer for producing the solid nitrogen particles at the same time or alternatively between the vessels to continuously produce solid nitrogen particles.

* * * * *